(12) United States Patent
Pettey et al.

(10) Patent No.: US 11,721,825 B1
(45) Date of Patent: Aug. 8, 2023

(54) FUEL CELL AND METHOD OF FORMING THE SAME

(71) Applicant: Response Technologies, LLC, Coventry, RI (US)

(72) Inventors: David Allen Pettey, Portsmouth, RI (US); Edmund Francis Bard, Cumberland, RI (US)

(73) Assignee: RESPONSE TECHNOLOGIES, LLC, Coventry, RI (US)

( * ) Notice: Subject to any disclaimer, the term of this patent is extended or adjusted under 35 U.S.C. 154(b) by 0 days.

(21) Appl. No.: 17/578,134

(22) Filed: Jan. 18, 2022

(51) Int. Cl.
| | | |
|---|---|---|
| *H01M 8/2475* | (2016.01) | |
| *H01M 8/1097* | (2016.01) | |
| *H01M 8/00* | (2016.01) | |
| *H01M 8/2404* | (2016.01) | |
| *H01M 8/1041* | (2016.01) | |

(52) U.S. Cl.
CPC ......... *H01M 8/1097* (2013.01); *H01M 8/002* (2013.01); *H01M 8/1055* (2013.01); *H01M 8/2404* (2016.02); *H01M 8/2475* (2013.01); *H01M 2250/20* (2013.01)

(58) Field of Classification Search
CPC .. H01M 8/1097; H01M 8/2404; H01M 8/002; H01M 8/1055; H01M 8/2475; H01M 2250/20
See application file for complete search history.

(56) References Cited

U.S. PATENT DOCUMENTS

2016/0303799 A1* 10/2016 Pettey .................. B33Y 80/00

\* cited by examiner

*Primary Examiner* — James Lee
(74) *Attorney, Agent, or Firm* — Slater Matsil, LLP

(57) ABSTRACT

In an embodiment, a fuel cell includes: a flexible substrate including a first fuel-tolerant material; a fitting on the flexible substrate, the fitting including first openings extending through an outer portion of the fitting; a primer coating on the outer portion of the fitting, the primer coating including a second fuel-tolerant material; first yarns strung through the first openings of the fitting, the first yarns stitched into the flexible substrate; and an encapsulant encapsulating the first yarns, the primer coating, and the outer portion of the fitting, the encapsulant disposed on the flexible substrate, the encapsulant including a third fuel-tolerant material, the third fuel-tolerant material chemically bonded to the second fuel-tolerant material and the first fuel-tolerant material.

9 Claims, 8 Drawing Sheets

FUEL CELL AND METHOD OF FORMING THE SAME

BACKGROUND

Vehicles such as cars, aircraft, and the like typically include a fuel system. A fuel system includes components for delivering fuel to an engine of the vehicle. As the demand for fuel efficient vehicles has increased, additional problems in fuel systems arise that should be addressed. Some types of aircraft present particular challenges to the increasing of fuel efficiency.

SUMMARY

In an embodiment, a fuel cell includes: a flexible substrate including a first fuel-tolerant material; a fitting on the flexible substrate, the fitting including first openings extending through an outer portion of the fitting; a primer coating on the outer portion of the fitting, the primer coating including a second fuel-tolerant material; first yarns strung through the first openings of the fitting, the first yarns stitched into the flexible substrate; and an encapsulant encapsulating the first yarns, the primer coating, and the outer portion of the fitting, the encapsulant disposed on the flexible substrate, the encapsulant including a third fuel-tolerant material, the third fuel-tolerant material chemically bonded to the second fuel-tolerant material and the first fuel-tolerant material. In some embodiments, the fuel cell further includes: second yarns stitched into the flexible substrate and over the first yarns, the encapsulant encapsulating at least some of the second yarns. In some embodiments of the fuel cell, the first fuel-tolerant material and the second fuel-tolerant material are polyvinylidene fluoride, and the third fuel-tolerant material is a polyurethane resin. In some embodiments of the fuel cell, the first yarns are bicomponent yarns including a core and a sheath. In some embodiments of the fuel cell, the sheath includes a bicomponent filament having a melting point in a range of 50° C. to 200° C. In some embodiments of the fuel cell, bundles of the first yarns are threaded through respective ones of the first openings of the fitting, the first yarns of the bundles radiating from the first openings. In some embodiments of the fuel cell, the first yarns of the bundles curve in a first direction as the first yarns radiate from the first openings. In some embodiments of the fuel cell, the first yarns of the bundles fan out as the first yarns radiate from the first openings. In some embodiments of the fuel cell, the fitting includes a second opening extending through an inner portion of the fitting, the inner portion of the fitting not covered by the encapsulant.

In an embodiment, a rotorcraft includes: a rigid fuel line; and a flexible fuel cell connected to the rigid fuel line, the flexible fuel cell including: a flexible substrate; a fitting on the flexible substrate; yarns attaching the fitting to the flexible substrate; and an encapsulant encapsulating the yarns and an outer portion of the fitting, the encapsulant bonded to the flexible substrate, the rigid fuel line extending through the encapsulant, the fitting, and the flexible substrate. In some embodiments, the rotorcraft further includes: an engine connected to the rigid fuel line. In some embodiments of the rotorcraft, the rigid fuel line is line for refueling the flexible fuel cell. In some embodiments of the rotorcraft, the flexible fuel cell further includes: a primer coating on the outer portion of the fitting, the encapsulant bonded to the primer coating. In some embodiments of the rotorcraft, the yarns are strung through the outer portion of the fitting and are stitched into the flexible substrate.

In an embodiment, a method includes: placing a first rigid fitting and a second rigid fitting on a first flexible substrate and a second flexible substrate, respectively, the first rigid fitting including first openings extending through a first outer portion of the first fitting, the second rigid fitting including second openings extending through a second outer portion of the second fitting; stitching first yarns through the first openings and into the first flexible substrate with an embroidering machine, the embroidering machine controlled according to a first computer numerical control process; stitching second yarns through the second openings and into the second flexible substrate with the embroidering machine, the embroidering machine controlled according to a second computer numerical control process, the second computer numerical control process different from the first computer numerical control process; and encapsulating the first yarns, the second yarns, the first rigid fitting, and the second rigid fitting with an encapsulant, the encapsulant extending through the first openings and the second openings. In some embodiments of the method, the first yarns form a first semi-rigid attachment structure for the first rigid fitting, and the second yarns form a second semi-rigid attachment structure for the second rigid fitting, the method further including: selecting the first computer numerical control process according to a first strength of the first semi-rigid attachment structure; and selecting the second computer numerical control process according to a second strength of the second semi-rigid attachment structure, the second strength different from the first strength. In some embodiments of the method, the first rigid fitting and the first flexible substrate form a first fitting patch, the second rigid fitting and the second flexible substrate form a second fitting patch, and the method further includes: attaching the first fitting patch to a first side of a flexible fuel cell body; and attaching the second fitting patch to a second side of the flexible fuel cell body. In some embodiments of the method, the first rigid fitting is smaller than the second rigid fitting. In some embodiments, the method further includes: forming a first primer coating on the first outer portion of the first fitting; and forming a second primer coating on the second outer portion of the second fitting. In some embodiments of the method, the first yarns and the second yarns include a filament component having a melting point, the encapsulant includes a polyurethane resin formulated from isocyanate and polyol, and the polyurethane resin is formulated at a temperature lower than the melting point of the filament component.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

According to various embodiments, a fuel cell for a vehicle is formed with a flexible fuel cell body. Fittings for rigid fuel lines are attached to the flexible fuel cell body with semi-rigid attachment structures. The semi-rigid attachment structures are more rigid than the flexible fuel cell body and are less rigid than the fittings and the fuel lines. This allows the semi-rigid attachment structures to buffer stress, reducing the risk of damage at the point where the rigid fuel line is mated to the flexible fuel cell body. Further, the semi-rigid attachment structures are formed by a computer numerical control (CNC) process which can be performed with high precision and repeatability. Less material may be used when forming the semi-rigid attachment structures, thereby reducing the weight of the resulting fuel cell.

Figure 1A:
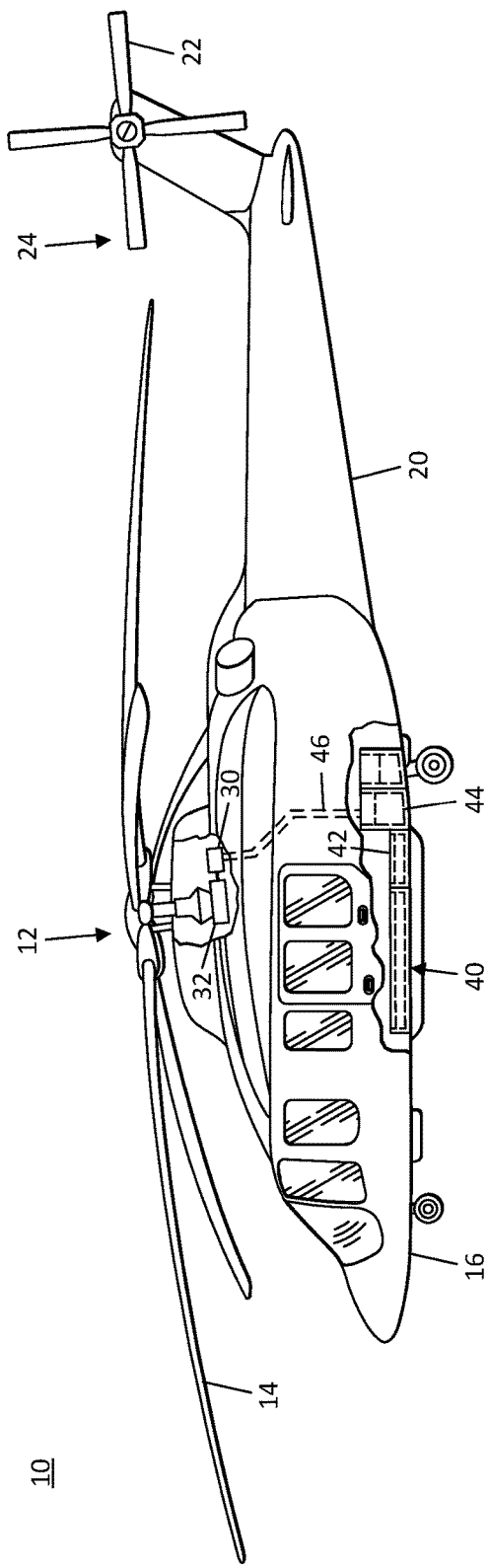
FIGS. 1A-1B are schematic views of a rotorcraft, in accordance with some embodiments.
Figure 1B:
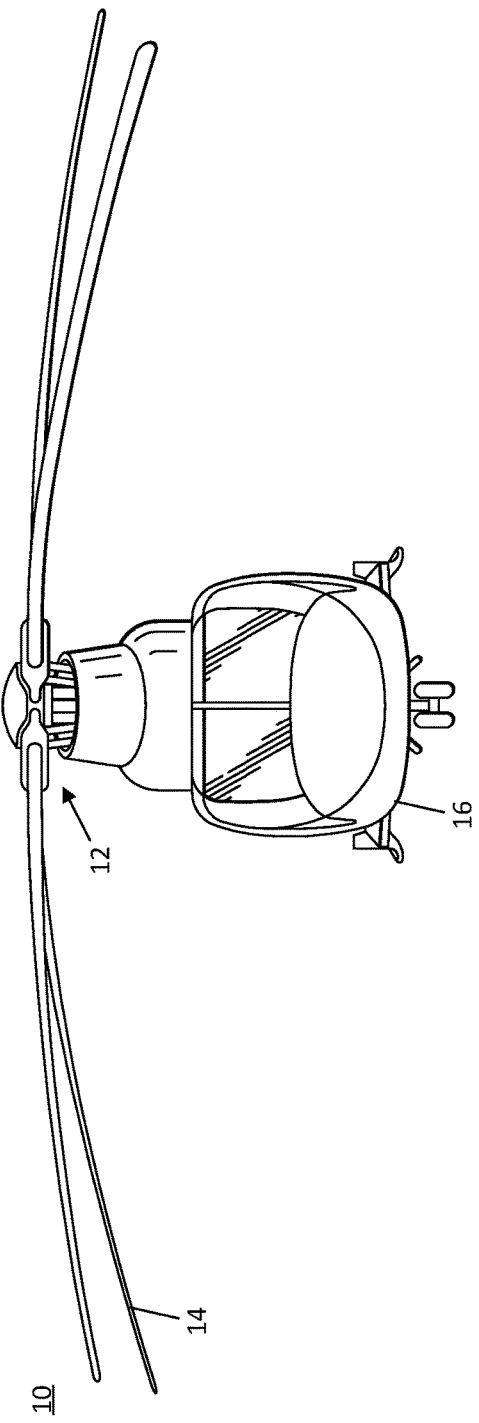

FIGS. 1A-1B are schematic views of a rotorcraft 10, in accordance with some embodiments. The rotorcraft 10 includes a main rotor hub assembly 12, which is rotatable relative to a fuselage 16 of the rotorcraft 10. The main rotor hub assembly 12 includes main rotor blades 14. The pitch of the main rotor blades 14 can be collectively and/or cyclically manipulated to selectively control direction, thrust, and lift of the rotorcraft 10. A tailboom 20 extends from the fuselage 16, and a tail rotor hub assembly 24 is attached to an aft portion of the tailboom 20. The tail rotor hub assembly 24 includes a tail rotor 22, which is rotatable relative to the tailboom 20. The tail rotor 22 may collectively provide thrust in the opposite direction as the rotation of the main rotor hub assembly 12, so as to counter torque effects created by the main rotor blades 14.

The components of the rotorcraft 10 (e.g., the main rotor hub assembly 12 and the tail rotor hub assembly 24) are powered by one or more engines 30. For example, the engines 30 may power the main rotor hub assembly 12 via a main rotor gearbox 32. The engines 30 may also power other components (not separately illustrated), such as alternators, cooling units, or the like. The rotorcraft 10 further includes a fuel system 40, which includes a fuel cell assembly 42. The fuel cell assembly 42 may be located in a lower portion of the fuselage 16. The fuel cell assembly 42 is coupled to the fuselage 16, and may be fully or partially integral with the fuselage 16, or may be an independent component which is secured to the fuselage 16. The fuel cell assembly 42 may be located elsewhere in the rotorcraft 10. The fuel cell assembly 42 includes one or more the fuel cells 44 for storing fuel. The fuel contained in the fuel cells 44 is used as an energy source to power the various systems of the rotorcraft 10 such as the main rotor hub assembly 12 and the tail rotor hub assembly 24. Specifically, the fuel system 40 is operable to deliver fuel stored in the fuel cells 44 to the engines 30. The fuel cells 44 may be fluidly coupled to components of the rotorcraft 10, such as the engines 30, with one or more fuel lines 46. The fuel lines 46 are hoses formed of a rigid material, such as a metal, such as aluminum, steel, or the like.

Figure 2A:
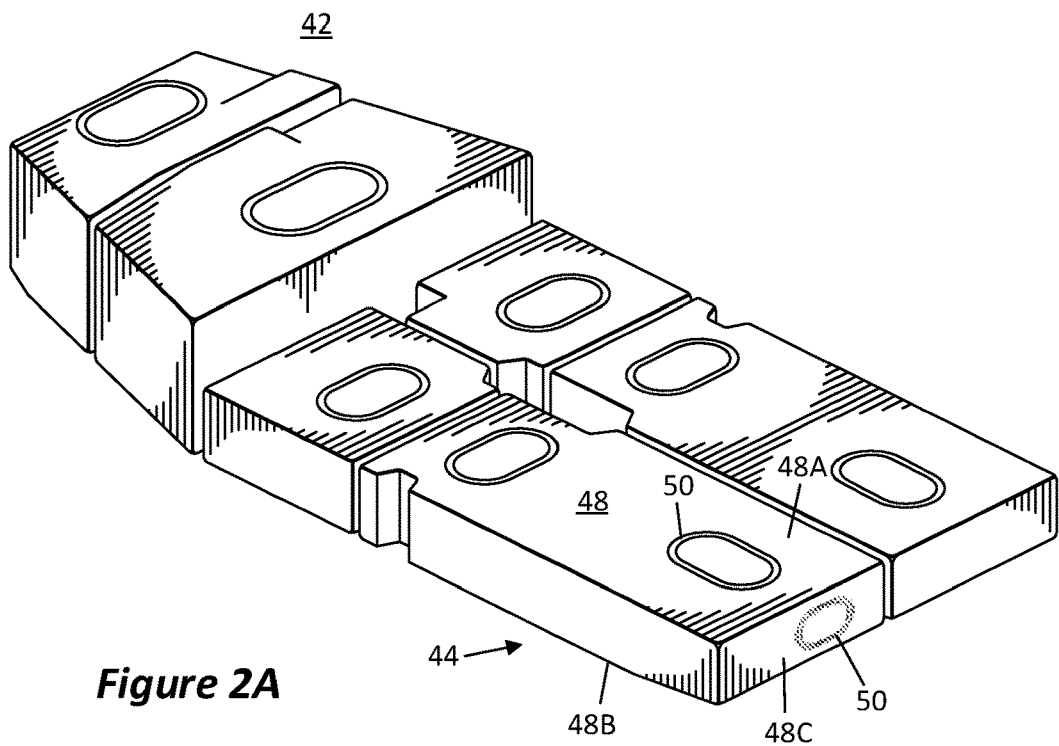
FIGS. 2A-2B are schematic views of a fuel cell assembly for a rotorcraft, in accordance with some embodiments.
Figure 2B:
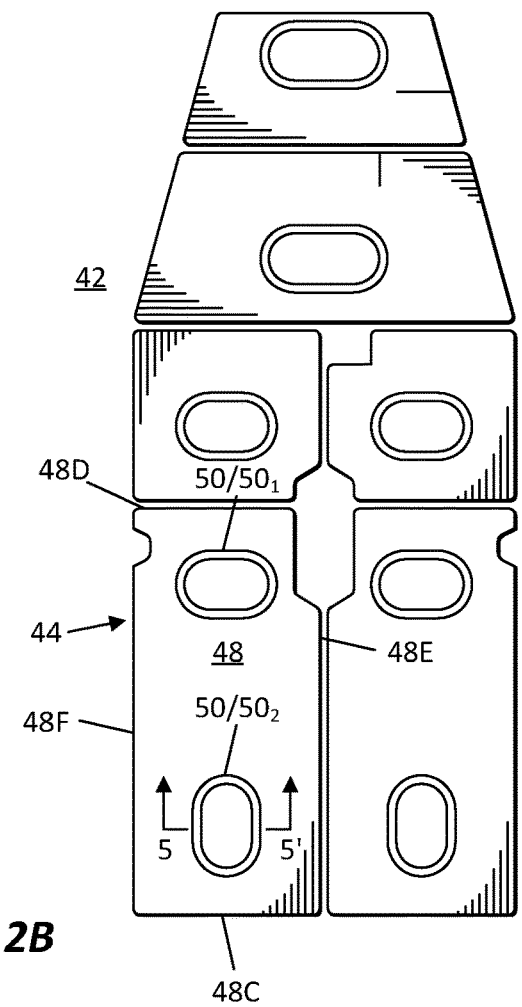

FIGS. 2A-2B are schematic views of a fuel cell assembly 42 for a rotorcraft, in accordance with some embodiments. As previously noted, the fuel cell assembly 42 includes one or more the fuel cells 44 for storing fuel. The fuel cells 44 may be fluidly coupled to one another to allow for the transfer of fuel therebetween. Each fuel cell 44 includes a flexible body 48 and one or more fittings 50. As will be subsequently described in greater detail, the fuel cells 44 also include semi-rigid attachment structures (not illustrated in FIGS. 2A-2B, but see FIG. 4) which attach the fittings 50 to the flexible bodies 48.

Each flexible body 48 is formed of one or more layers of flexible materials, such as fabric and/or composite materials, so that fuel cell 44 is a flexible fuel bag or fuel bladder. Flexible fuel cell bodies are more resistant to ballistic projectiles than rigid fuel cell bodies, which may be advantageous when the rotorcraft is utilized in military applications. For example puncturing of the fuel cells 44 during operation may result in a loss of fuel supply to the components of the rotorcraft. In some embodiments, the flexible body 48 includes an inner layer, an outer layer around the inner layer, and a middle layer between the outer layer and the inner layer. The inner layer may be formed of a fuel-tolerant material such as polyvinylidene fluoride, nylon, urethane, or the like. Any material which is substantially inert to fuel may be utilized for the inner layer. The outer layer may be formed of a puncture-resistant material such as a metal or metal alloy. Any material which is substantially resistant to being pierced may be utilized for the outer layer. The middle layer may be formed of a self-healing gel, such as an elastomeric gel. Any material which is capable of expanding to self-seal holes (e.g., ballistically formed holes) in the flexible body 48 may be utilized for the middle layer. The flexible body 48 is defined by multiple sides, including a top side 48A, a bottom side 48B, a forward side 48C, an aft side 48D, a port side 48E, and a starboard side 48F. However, it should be appreciated that the flexible body 48 may have any number of curved or straight sides, which each face any desired direction. Each of the fuel cells 44 may have different shapes, as shown, or may have the same shape.

The fittings 50 are attached to the flexible bodies 48, and are part of inlets/outlets for the fuel cells 44. Fuel may be added to or removed from a fuel cell 44 through a fitting 50 and a fuel line 46 (see FIG. 1A) which is connected to the fitting 50. The fuel lines 46 connected to the fittings 50 may be fuel lines for delivering fuel to the components (e.g., engines) of the rotorcraft, fuel lines for refueling the fuel cells 44, or the like. As previously noted, the fuel lines 46 are rigid. The fittings 50 are also formed of a rigid material. Acceptable rigid materials for the fittings 50 include metals such as aluminum, steel, or the like; composite materials such as a stack-up of a carbon fiber reinforcement fabric within a fuel resistant 2K urethane matrix; or the like. In some embodiments, the fuel lines 46 and the fittings 50 are formed of the same rigid material. The fittings 50 may function as mating points where the rigid fuel lines 46 connect to the flexible bodies 48 of the fuel cells 44. The fuel lines 46 and the fittings 50 are more rigid than the flexible bodies 48. Some of the fittings 50 may also be utilized to fluidly coupled the fuel cells 44 to one another. The fittings 50 are ring-shaped.

The fuel cells 44 may have any desired quantity of fittings 50. In some embodiments, the fuel cells 44 have from six to eight fittings 50. Further, the fuel cells 44 may have different shapes and/or sizes of fittings 50. For example, a fuel cell 44 may have a first fitting $50_1$ of a first size and/or shape for refueling the fuel cell 44, and may have a second fitting $50_2$ of a different second size and/or shape for delivering fuel to the components of the rotorcraft from the fuel cell 44. Further, although the fittings 50 are shown in FIGS. 2A-2B as having a stadium ring shape, the fittings 50 may have any acceptable ring shape. For example, and as will be subsequently described for FIGS. 3A-3B, the fittings 50 may have a circular ring shape.

Figure 3A:
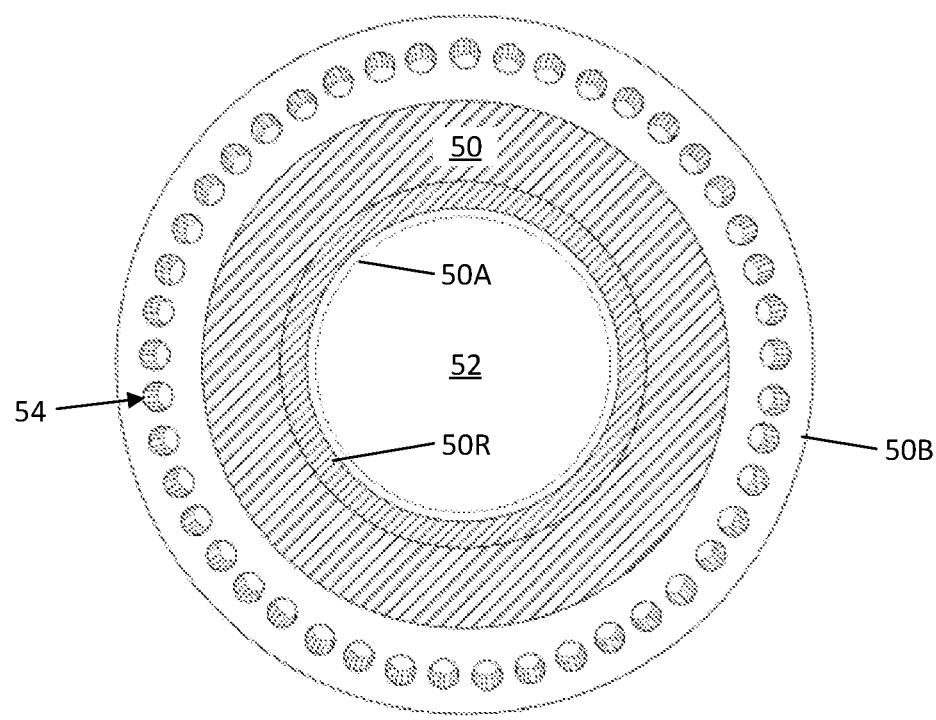
FIGS. 3A-3B are detailed views of a fitting for a fuel cell, in accordance with some embodiments.
Figure 3B:
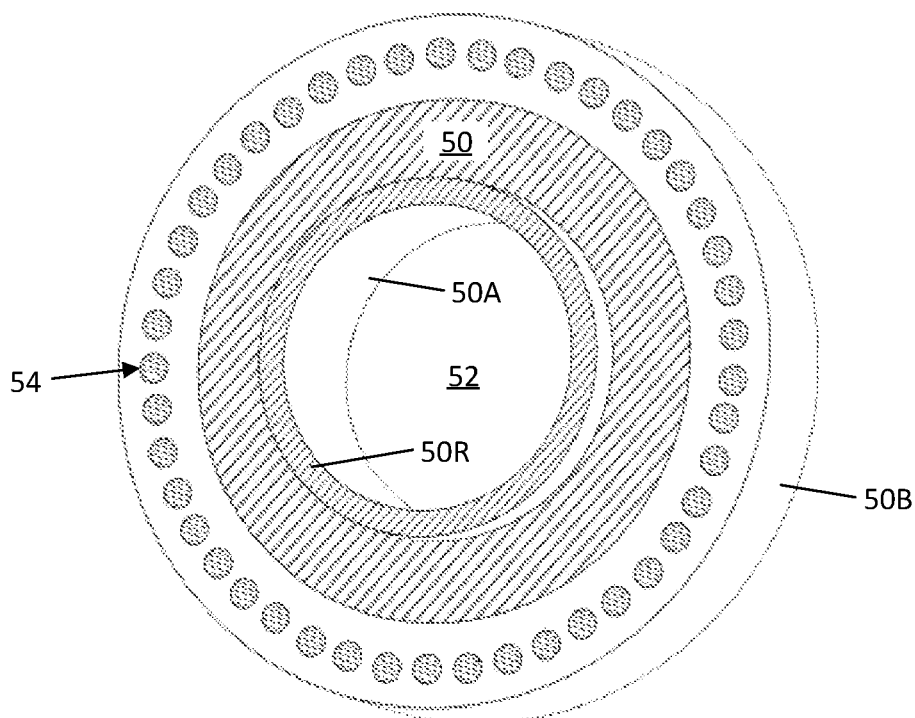

FIGS. 3A-3B are detailed views of a fitting 50 for a fuel cell, in accordance with some embodiments. As previously noted, the fitting 50 has a ring shape. In this embodiment, the fitting 50 has a circular ring shape, such that the fitting 50 is an annulus. The fitting 50 is defined by an inner sidewall 50A an outer sidewall 50B. The inner sidewall 50A is a sidewall of an inner portion of the fitting 50, and the outer sidewall 50B is a sidewall of an outer portion of the fitting 50. The inner sidewall 50A defines a first opening 52, which extends through the center of the fitting 50. During operation, fuel flows through the first opening 52 for ingress to and egress from the fuel cell. The outer sidewall 50B defines the edge of the fitting 50. In some embodiments, the fitting 50 is a single continuous rigid material which extends from the inner sidewall 50A to the outer sidewall 50B. In some embodiments, the inner portion of the fitting 50 includes a raised portion 50R, and the inner sidewall 50A includes a sidewall of the raised portion 50R. The raised portion 50R is raised from a top surface of the fitting 50.

A plurality of second openings 54 are disposed around the first opening 52. The second openings 54 extend through the fitting 50. The second openings 54 are in the outer portion of the fitting 50, such that they are closer to the outer sidewall 50B than to the inner sidewall 50A. As will be subsequently described in greater detail, semi-rigid attachment structures (not illustrated in FIGS. 3A-3B, but see FIG. 4) will be formed in the second openings 54 to attach the fittings 50 to a flexible fuel cell body.

Optionally, a primer coating 56 is on the outer portion of the fitting 50. The primer coating 56 is on the outer sidewall 50B of the fitting 50, and is on top and bottom surfaces of the outer portion of the fitting 50. The inner sidewall 50A of the fitting 50 and the top and bottom surfaces of the inner portion of the fitting 50 are free of the primer coating 56. The primer coating 56 may be formed of a fuel-tolerant material such as polyvinylidene fluoride, nylon, urethane, or the like, which is capable of adhering to the fitting 50. Any material which is substantially inert to fuel may be utilized for the primer coating 56. In some embodiments, the primer coating 56 includes the same fuel-tolerant material as the outer layer of the flexible body 48 of the fuel cell 44 (see FIGS. 2A-2B).

As will be subsequently described in greater detail, the material of the primer coating 56 is capable of forming strong chemical bonds with an encapsulant 66 (see below, FIG. 4) that will be subsequently used to encapsulate the outer portion of the fitting 50, thereby increasing adhesive strength of the encapsulant 66. For example, the adhesive strength of the encapsulant 66 without the primer coating 56 may be less than about 20 pounds per linear inch, and the adhesive strength of the encapsulant 66 with the primer coating 56 may be greater than about 100 pounds per linear inch. When the encapsulant 66 is formed of a urethane-based resin, the primer coating 56 is formed of a material that is co-attachable to the fitting 50 and the encapsulant 66.

Figure 4:
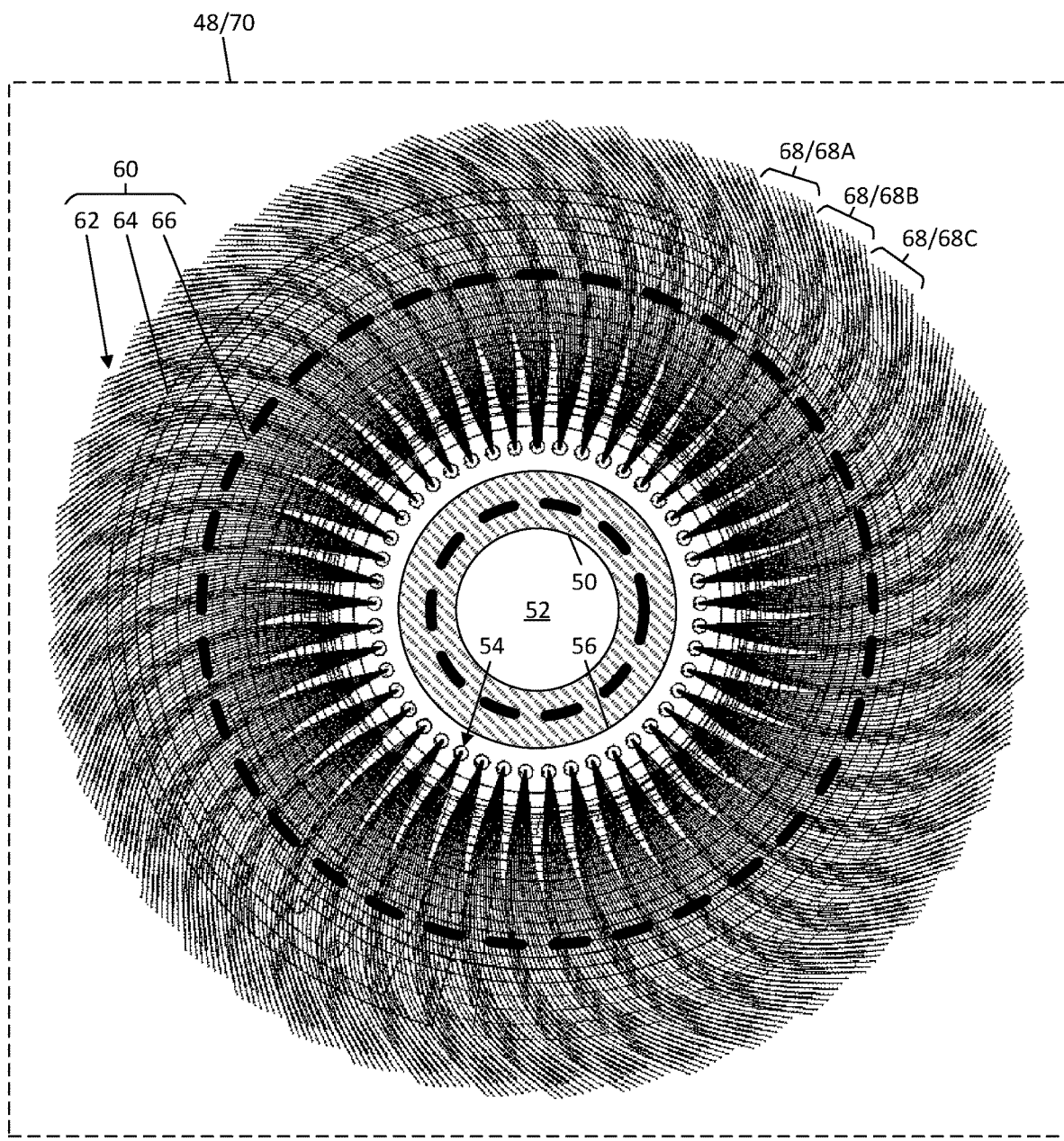
FIG. 4 is a detailed view of a portion of a fuel cell, in accordance with some embodiments.

FIG. 4 is a detailed view of a portion of a fuel cell 44, in accordance with some embodiments. A fitting 50, a flexible substrate 70, and an attachment structure 60 for the fitting 50 and the flexible substrate 70 are shown. The attachment structure 60 includes a plurality of main yarns 62, plurality of support yarns 64, and an encapsulant 66 (shown in ghost for clarity of illustration). The flexible substrate 70 may be formed of a similar fuel-tolerant material as the outer layer of the flexible body 48. As will be subsequently described in greater detail, the flexible substrate 70 will be subsequently attached to the flexible body 48.

The fuel cell 44 is flexible so that it may deform without cracking in response to external stress. If fuel lines (which are rigid) were connected directly to the fuel cell 44 (which is flexible), there would be discontinuous transition in rigidity at the connecting point. This discontinuous transition presents a high risk of failure. The attachment structure 60 serves as a transition in rigidity at the connecting point for the fuel lines. The attachment structure 60 is semi-rigid, being more rigid than the flexible body 48 and less rigid than the fuel lines and the fitting 50. Specifically, the attachment structure 60 is flexible enough to undergo some deformation responsive to external stress, but is rigid enough to spring back to its original position after the external stress is removed. In other words, the attachment structure 60 is capable of acting as a buffer for stress, helping reduce the risk of the rigid fuel line cutting, tearing, or shearing the flexible body 48 when stress is exerted on the fuel cell 44. The formation of voids around the attachment structure 60 during deformation may thus be avoided, reducing the risk of leaks from the fuel cell 44.

The main yarns 62 are strung through the second openings 54 and are stitched into the flexible substrate 70, thereby securing the outer portion of the fitting 50 to the flexible substrate 70. The main yarns 62 are high tenacity yarns which are capable of withstanding large forces. The main yarns 62 may be formed of polyester, a 100-denier ultra-high-molecular-weight polyethylene (UHMWPE) filament thread having a tenacity of at least 30 grams per denier, a 150-denier high-tenacity polyester yarn having a tenacity of at least 7.5 grams per denier, or the like. In some embodiments, the main yarns 62 are bicomponent yarns, e.g., yarns including a core of a first filament component and a sheath of a second filament component. The core may have a higher tenacity than the sheath, and the sheath may have a lower melting point than the core. In some embodiments, the sheath is a bicomponent filament having a low melting point, such as a temperature in the range of 50° C. to 200° C. For example, the bicomponent filament with a low melting point may be a UHMWPE. The main yarns 62 are grouped into bundles 68 (including bundles 68A, 68B, 68C), with each respective bundle 68 being threaded through a respective one of the second openings 54. The main yarns 62 of each respective bundle 68 radiate from their respective second opening 54, and fan out as they radiate from the respective second opening 54. In some embodiments, the ends of the main yarns 62 in each bundle 68 (e.g., the ends distal the fitting 50) are separated by the same distance. The main yarns 62 may (or may not) curve as they radiate from the fitting 50. In various embodiments, the main yarns 62 may curve in the same direction (as illustrated), may curve in different directions, or may be straight.

The strength of the attachment structure 60 is determined by several properties of the main yarns 62. The tenacity of the main yarns 62 contributes to the strength of the attachment structure 60, with a larger tenacity resulting in a stronger attachment structure. In some embodiments, the main yarns 62 have a tenacity in the range of 30 grams breaking force per denier to 40 grams breaking force per denier. The areal density of the main yarns 62 (e.g., on the surface of the flexible substrate 70) also contributes to the strength of the attachment structure 60, with a larger areal density resulting in a stronger attachment structure. In some embodiments, the main yarns 62 have an areal density in the range of 3 per $cm^2$ to 50 per $cm^2$. The length of the main yarns 62 (e.g., the length the yarns 62 radiate from the fitting 50) also contributes to the strength of the attachment structure 60, with a larger length resulting in a stronger attachment structure. In some embodiments, the main yarns 62 have a length in the range of 7 cm to 70 cm. The radius of curvature of the main yarns 62 also contributes to the strength of the attachment structure 60, with a larger radius of curvature resulting in a stronger attachment structure. In some embodiments, the main yarns 62 have a radius of curvature (e.g., arc length) in the range of 11 cm to 16 cm. The main yarns 62 may have the same or different tenacities; the same or different densities; the same or different lengths; or the same or different radii of curvature. Although these properties of the main yarns 62 contribute to the strength of the attachment structure 60, they also contribute to the mass of the attachment structure 60. As will be subsequently described in greater detail, when the attachment structure 60 is formed, the tenacity, areal density, length, and radius of curvature of the main yarns 62 is selected to obtain a desired strength while maintaining a desired mass.

The support yarns 64 are stitched into the flexible substrate 70 and over the main yarns 62, thereby helping secure the main yarns 62 to the flexible substrate 70. The support yarns 64 extend at least partially around the fitting 50, such that each support yarn 64 crosses a plurality of the main yarns 62. The support yarns 64 may be formed of the same fibers as the main yarns 62, or may include different fibers than the main yarns 62.

The encapsulant 66 encapsulates the outer portion of the fitting 50, at least a portion of each main yarn 62, and at least some of the support yarns 64. The encapsulant 66 covers the outer portion of the fitting 50 where the main yarns 62 are strung through the second openings 54, and also covers at least a portion of the primer coating 56. An inner portion of the fitting 50 is not covered by the encapsulant 66, so that a rigid surface of the fitting 50 may be exposed for subsequent connection to a fuel line. The encapsulant 66 further covers some portions of the flexible substrate 70, e.g., the portions between the yarns 62, 64. Further, the encapsulant 66 fills the remaining portions of the second openings 54 which are not filled by the main yarns 62. The encapsulant 66 is formed of a fuel-tolerant material such as a polyurethane resin. The fuel-tolerant material of the encapsulant 66 is capable of forming strong chemical bonds with the fuel-tolerant material(s) of the primer coating 56 and the substrate 70. The material of the encapsulant 66 may be different from the material(s) of the primer coating 56 and the substrate 70. The fuel-tolerant material of the encapsulant 66 may also be capable of forming strong chemical bonds with the material(s) of the yarns 62, 64.

FIGS. 5A-5D are views of intermediate stages in the manufacturing of a fuel cell 44, in accordance with some embodiments. FIGS. 5A-5D are cross-sectional views of a portion of a fuel cell 44 along a similar cross-section as reference cross-section 5-5' in FIG. 2B, and show the formation of an attachment structure 60. The attachment of a single fitting 50 to a flexible body 48 is illustrated. As will be subsequently described in greater detail, multiple fittings 50 may be attached to a flexible body 48. FIG. 6 is a flow diagram of a method 600 for manufacturing a fuel cell 44, and is described with FIGS. 5A-5D.

Figure 5A:
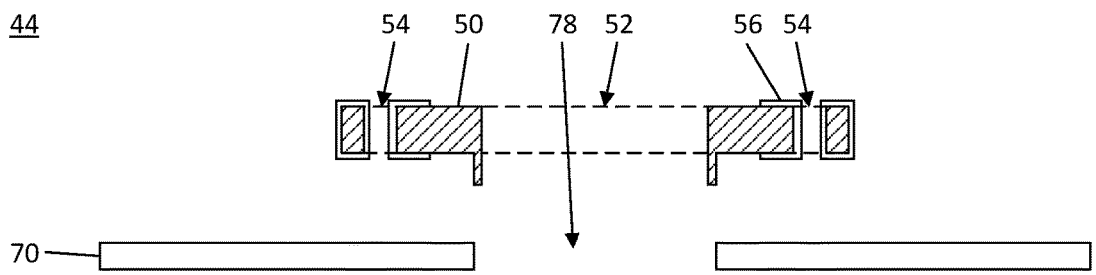
FIGS. 5A-5D are views of intermediate stages in the manufacturing of a fuel cell, in accordance with some embodiments.
Figure 6:
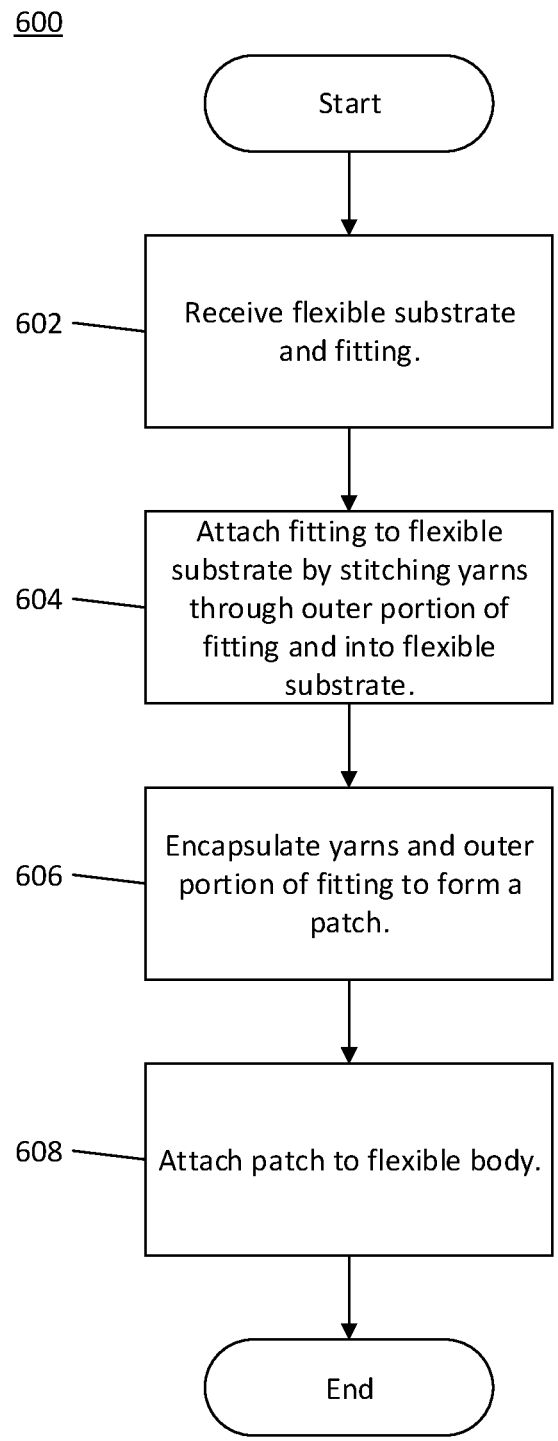
FIG. 6 is a flow diagram of a method for manufacturing a fuel cell, in accordance with some embodiments.

In FIG. 5A and step 602, a flexible substrate 70 and a fitting 50 are received or formed. The fitting 50 may be formed by milling a metal or composite material. The milling may be controlled using a CNC process. In embodiments where a primer coating 56 is on the fitting 50, the primer coating 56 may be formed by treating the outer portions of the fitting 50 with a polymeric plasma coating process. An opening 78 is formed in the flexible substrate 70. The opening 78 may be formed by cutting the flexible substrate 70 using the fitting 50 as a stencil.

Figure 5B:
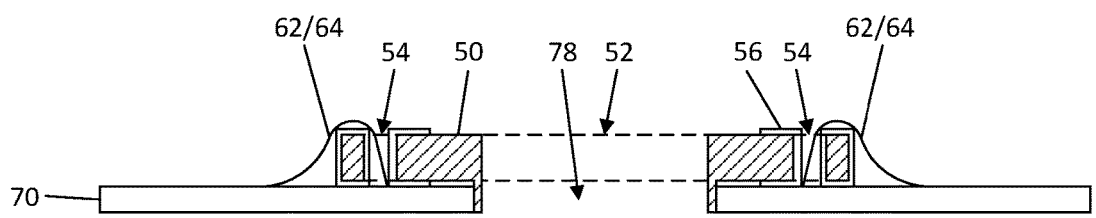

In FIG. 5B and step 604, the fitting 50 is attached to the flexible substrate 70. Attaching the fitting 50 to the flexible substrate 70 includes placing the fitting 50 on the flexible substrate 70 so that the raised portion 50R of the fitting 50 extends through the opening 78, and then attaching the outer portion of the fitting 50 to the flexible substrate 70 with the yarns 62, 64. In embodiments where the primer coating 56 is present, the primer coating 56 contacts the outer surface of the flexible substrate 70. In embodiments where the primer coating 56 is omitted, the fitting 50 contacts the outer surface of the flexible substrate 70.

The outer portion of the fitting 50 is attached to the flexible substrate 70 by stitching the main yarns 62 through the second openings 54 and into the flexible substrate 70. The support yarns 64 are then stitched over the main yarns 62 and into the flexible substrate 70. The yarns 62, 64 may be stitched into the flexible substrate 70 using an embroidering machine such as a JGW-0100-650 Technical Embroidering Machine from ZSK. The stitching is controlled using a CNC process, which determines the placement of the yarns 62, 64. Utilizing a CNC process improves the accuracy and repeatability of the stitching, especially when compared to manual stitching. Manufacturing yield may thus be improved. The CNC process is one which is capable of controlling the stitching (e.g., needle movement) in three directions (e.g., X-axis, Y-axis, and Z-axis). Controlling the stitching along the Z-axis allows the yarns 62 to be threaded through the second openings 54 even when the fitting 50 has a large thickness. The stitching may be performed by programming the CNC process for the embroidering machine, and then performing the stitching with the embroidering machine controlled using the CNC process. The CNC process programming may be performed using, e.g., EPCWin from ZSK. As will be subsequently described in greater detail, the CNC process is programmed according to the desired strength of the resulting attachment structure 60. Achieving a desired density, length, and radius of curvature for the main yarns 62 is easier with a CNC process than manual stitching, as CNC processes are less prone to error than manual stitching. As such, the stitching may be performed with a smaller margin of error, and so less of the yarns 62, 64 may be used while still achieving the desired density, length, and radius of curvature. The weight of the fuel cell 44 may thus be reduced, which is particularly advantageous when the fuel cell 44 is utilized for an aircraft.

Figure 5C:
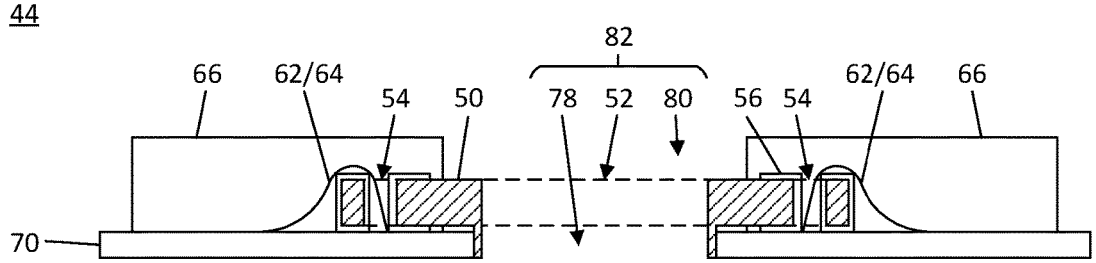

In FIG. 5C and step 606, the encapsulant 66 is formed amongst the yarns 62, 64, the fitting 50, and the flexible substrate 70. Specifically, the encapsulant 66 is formed around the outer portion of the fitting 50, at least a portion of each main yarn 62, and at least some of the support yarns 64. The encapsulant 66 may also be formed on at least a portion of the primer coating 56 and the outer surface of the flexible substrate 70. The encapsulant 66 is not formed in the openings 52, 78, so that they remain unobstructed. The encapsulant 66 may be formed by compression molding, injection molding, or the like. In some embodiments, the mold is an aluminum mold, and the molding process is performed at a vacuum, which can help avoid the formation of voids in the encapsulant 66, such as voids in the second openings 54 or voids around the yarns 62, 64. An opening 80 extends through the encapsulant 66. The opening 80 exposes the inner portion of the fitting 50, and is aligned with the openings 52, 78. In the illustrated embodiment, the encapsulant 66 covers all of the primer coating 56. In another embodiment, the encapsulant 66 covers a portion of the primer coating 56. The encapsulant 66 is also formed in any spaces between the fitting 50 and the flexible substrate 70.

In some embodiments where the yarns 62, 64 are bicomponent yarns having a sheath with a low melting point, the molding process for the encapsulant 66 is a cold chemistry process. For example, the encapsulant 66 may be a polyurethane resin formulated from isocyanate and polyol. The isocyanate may be methylene diphenyl diisocyanate and the polyol may be a polyether. The molding process for the encapsulant 66 is performed at a temperature which is lower than the melting point of the sheath of the yarns 62, 64. In some embodiments, the molding process is performed at a temperature in the range of 20° C. to 100° C. A curing process (e.g., vulcanization process) for the encapsulant 66 may thus be omitted from the molding process, decreasing processing time. During formation, the material of the encapsulant 66 forms strong chemical bonds (such as covalent bonds) with the material(s) of the primer coating 56 and the flexible substrate 70. Thus, the fuel-tolerant material of the encapsulant 66 is chemically bonded to the fuel-tolerant material of the primer coating 56 and the fuel-tolerant material of the flexible substrate 70. The strength of the resulting attachment structure 60 may thus be improved. The flexible substrate 70, the encapsulant 66, the yarns 62, 64, and the fitting 50 collectively form a fitting patch, which is a pre-formed fitting patch for a fuel cell 44.

The openings 52, 78, 80 collectively define an opening 82. The opening 82 extends through the fitting patch (e.g., through the encapsulant 66, the fitting 50, and the flexible substrate 70). As such, the opening 82 defines an inlet/outlet for the fuel cell 44. A rigid fuel line (e.g., the fuel line 46; see FIG. 1A) extends through the opening 82.

Figure 5D:
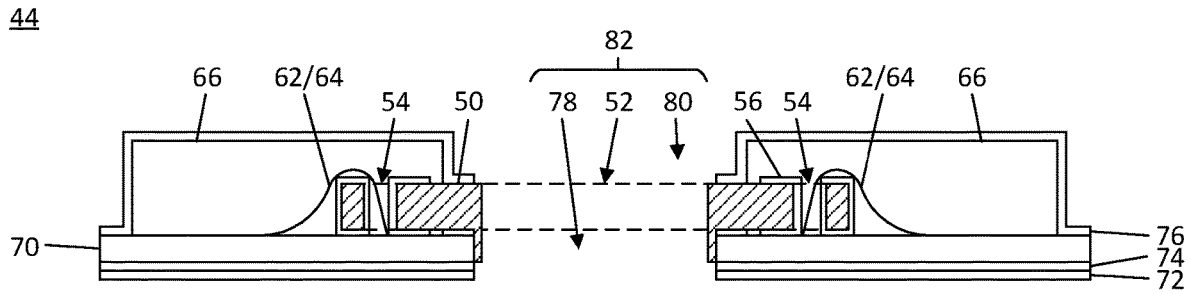

In FIG. 5D and step 608, the fitting patch (including the encapsulant 66, the yarns 62, 64, the flexible substrate 70, and the fitting 50) is attached to a flexible body 48 for a fuel cell 44. As previously noted, the flexible body 48 includes an inner layer 72, a middle layer 74, and an outer layer 76. In some embodiments, the fitting patch is attached to the flexible body 48 such that it is disposed between the middle layer 74 and the outer layer 76. When the flexible body 48 is formed of layers of composite materials, the various layers may be laminated on each other and on the fitting patch.

As previously noted, the fuel cells 44 may have any desired quantity of fittings 50. Each of the fittings 50 may be attached to a flexible body 48 using a similar process as previously described for FIGS. 5A-5D and 6. The attachment structures 60 may be formed to have different strengths, as called for by the design of a fuel cell 44. For example, a first attachment structure 60 may be in a high-stress region of a fuel cell 44 and may be formed to have a greater strength, while a second attachment structure 60 may be in a low-stress region of the fuel cell 44 and may be formed to have a lesser strength. Referring back to FIGS. 2A-2B, a fitting 50 at the top side 48A or the bottom side 48B of a flexible body 48 may be subject to lower stresses than a fitting 50 at the forward side 48C, aft side 48D, port side 48E, and starboard side 48F of the flexible body 48. More generally, fitting 50 at larger sides of a flexible body 48 may be subject to lower stresses than fittings 50 at smaller sides of a flexible body 48. Further, smaller fittings 50 may be subject to lower stresses than larger fittings 50.

The strength of an attachment structure 60 may be controlled by adjusting the density, length, and radius of curvature for the main yarns 62 of the attachment structure 60. Those properties for the main yarns 62 may be adjusted by programming a CNC process for the embroidering machine in accordance with those properties. For example, to form a first attachment structure 60 when a greater strength is desired, a first CNC process for the embroidering machine may be programmed so that the embroidering machine stitches the main yarns 62 for the first attachment structure 60 with a large density, large length, and/or large radius of curvature. Similarly, to form a second attachment structure 60 when a lesser strength is desired, a second CNC process for the embroidering machine may be programmed so that the embroidering machine stitches the main yarns 62 for the second attachment structure 60 with a small density, small length, and/or small radius of curvature. Programming a CNC process may include modelling the stress that an attachment structure 60 will undergo during operation, and selecting the density, length, and radius of curvature for the main yarns 62 which will produce a strong enough attachment structure to withstand that stress. In some embodiments, the CNC process for the embroidering machine is selected from a lookup table in which the density, length, and radius of curvature for yarns are indexed according to the desired strength of the resulting attachment structure.

As previously noted, stronger attachment structures have a larger mass. In some embodiments, each attachment structure 60 is formed to have a strength that is sufficient for its design, but is not excessively larger than the strength called for by the design. Accordingly, each attachment structure 60 may be formed to a sufficient strength without excessively increasing the mass of the fuel cell 44. Controlling the stitching of the main yarns 62 with a CNC process allows the strength of each attachment structure 60 to be more precisely controlled than manual stitching, allowing for a larger degree of optimization when balancing strength and mass.

Other properties may also contribute to the strength of the attachment structure 60. The quantity of second openings 54 in the fittings 50 also contributes to the strength of the attachment structure 60, with a larger quantity of second openings 54 resulting in a stronger attachment structure. In some embodiments, the quantity of second openings 54 in the fittings 50 is also determined according to the desired strength of the resulting attachment structure.

In some embodiments, the process previously described for FIGS. 5A-5D and 6 may be utilized to manufacture a pre-formed fitting patch for a fuel cell 44, in lieu of manufacturing an entire fuel cell 44. For example, step 608 may be omitted, thereby forming a fitting patch having a pre-attached fitting 50. The pre-formed fitting patch may then be stored and subsequently utilized to repair a damaged fuel cell 44 or manufacture a new fuel cell 44. For example, a damaged fitting 50 may be removed from the flexible body 48 of a fuel cell 44, and a pre-formed fitting patch having a pre-attached fitting 50 may then be attached to the flexible body 48 of the fuel cell 44, thereby replacing the damaged fitting 50.

Some variations of the process previously described for FIGS. 5A-5D and 6 are contemplated. For example, the flexible substrate 70 may be omitted, and instead a fitting 50 may be directly attached to a flexible body 48 of a fuel cell 44. In such an embodiment, a similar process as described for steps 602-606 may be performed using the flexible body 48 in lieu of the flexible substrate 70.

Figure 7:
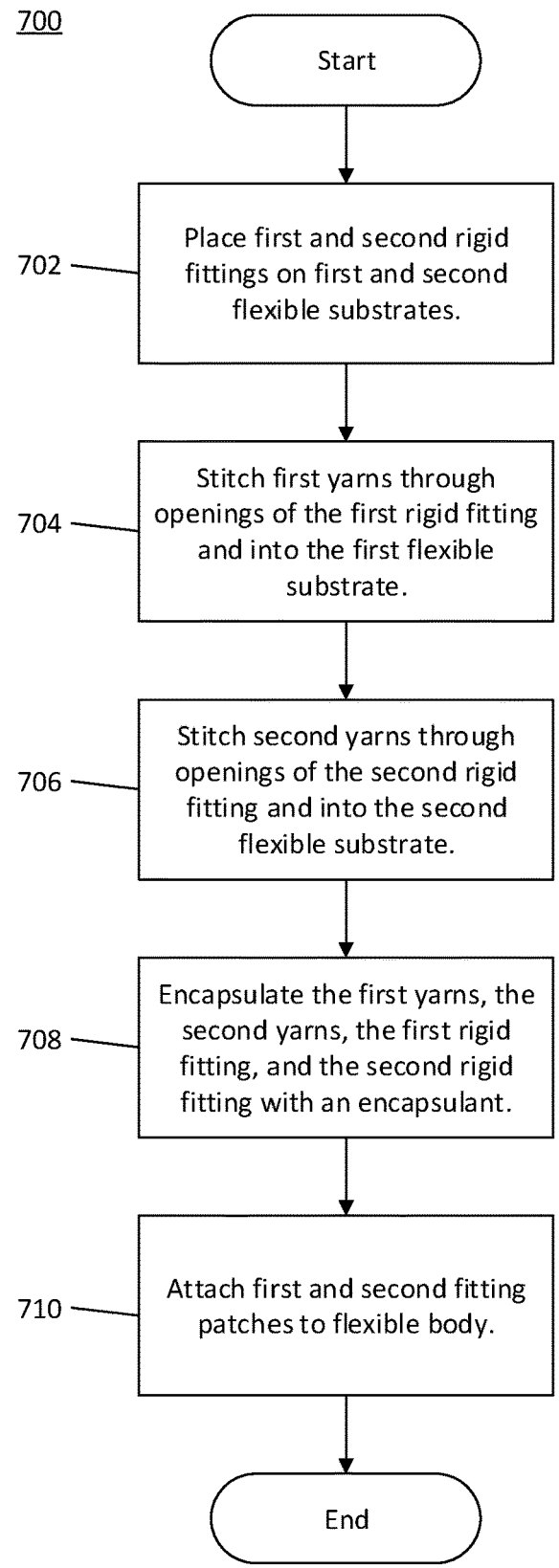
FIG. 7 is a flow diagram of a method for manufacturing a fuel cell, in accordance with some embodiments.

FIG. 7 is a flow diagram of a method 700 for manufacturing a fuel cell 44, in accordance with some embodiments. The method 700 is performed to attach multiple fittings 50 to a flexible body. The method 700 is described in conjunction with reference to the features illustrated in FIGS. 2A-4.

In step 702, a first rigid fitting 50 and a second rigid fitting 50 are placed on a first flexible substrate 70 and a second flexible substrate 70. The first rigid fitting 50 includes openings 54 extending through an outer portion of the first fitting 50. The second rigid fitting 50 includes openings 54 extending through an outer portion of the second fitting 50. The first rigid fitting 50 may be smaller than the second rigid fitting 50.

In step 704, first main yarns 62 are stitched through the openings 54 of the first rigid fitting 50 and into the first flexible substrate 70 with an embroidering machine. The embroidering machine is controlled according to a first computer numerical control process. The first computer numerical control process may be selected according to a desired strength of a semi-rigid attachment structure 60 which will be formed from the first main yarns 62 for the first rigid fitting 50.

In step 706, second main yarns 62 are stitched through the openings 54 of the second rigid fitting 50 and into the second flexible substrate 70 with the embroidering machine. The embroidering machine is controlled according to a second computer numerical control process. The second computer numerical control process may be selected according to a desired strength of a semi-rigid attachment structure 60 which will be formed from the second main yarns 62 for the second rigid fitting 50. The second computer numerical control process is different from the first computer numerical control process, and the strength of the semi-rigid attachment structure 60 for the second rigid fitting 50 is different from the strength of the semi-rigid attachment structure 60 for the first rigid fitting 50.

In step 708, the first main yarns 62, the second main yarns 62, the first rigid fitting 50, and the second rigid fitting 50 are encapsulated with an encapsulant 66. The encapsulant 66 extends through the openings 54 of the first rigid fitting 50 to form first fitting patch, and extends through the openings 54 of the second rigid fitting 50 to form second fitting patch. The encapsulant 66 is formulated at a temperature which is lower than the melting point of the sheath of the first main yarns 62 and the second main yarns 62.

Figure 8A:
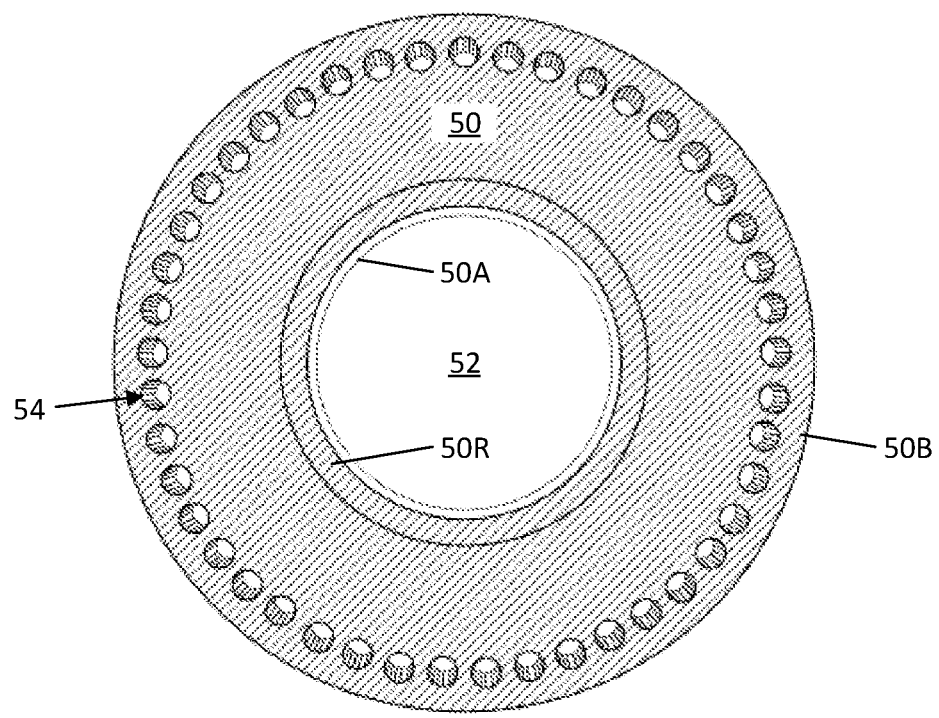
FIGS. 8A-8B are detailed views of a fitting for a fuel cell, in accordance with some other embodiments.
Figure 8B:
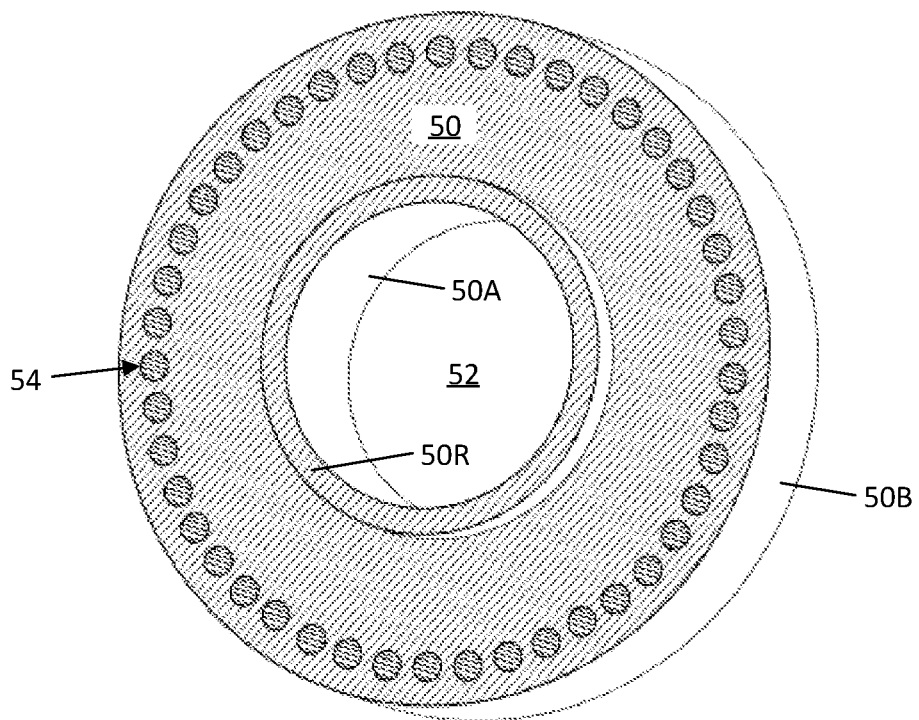

FIGS. 8A-8B are detailed views of a fitting 50 for a fuel cell, in accordance with some other embodiments. This embodiment is similar to the embodiment of FIGS 3A-3B, except the primer coating 56 is omitted. Manufacturing costs may thus be reduced.

Embodiments may achieve advantages. Forming the fuel cell 44 with flexible body 48 can make them more resistant to ballistic projectiles. Attaching a fitting 50 to a flexible body 48 with an attachment structure 60 that is semi-rigid can improve the reliability of the mating point for the fuel cell 44, as the attachment structure 60 acts to buffer stress. Further, attaching a fitting 50 to a flexible body 48 by stitching that is controlled with a CNC process allows the stitching to be performed with greater precision and repeatability. Less yarns may be used when attaching the fitting 50 to the flexible body 48, reducing the weight of the resulting fuel cell 44, which may increase fuel efficiency of the rotorcraft 10.

Although described in the context of fuel cells, some embodiments may be utilized to attach other types of rigid fittings to other types of flexible substrates. For example, similar processes could be performed to attach cleats to a sponson. Likewise, similar process could be performed to embed smart hardware into tanks, sponsons, sonobuoys, or the like.

Further, some embodiments contemplate use of the fittings 50 in other applications. Specifically, the fittings 50 may be used to attach a fuel cell 44 to other elements besides a rigid fuel line. As noted above, some of the fittings 50 may be utilized to fluidly coupled multiple fuel cells 44 to one another. Likewise, other fuel cells 44 may have fittings 50 that are reserved for adding fuel to or removing fuel from a fuel cell 44.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A fuel cell comprising:
   a flexible substrate comprising a first fuel-tolerant material;
   a fitting on the flexible substrate, the fitting comprising first openings extending through an outer portion of the fitting;
   a primer coating on the outer portion of the fitting, the primer coating comprising a second fuel-tolerant material;
   first yarns strung through the first openings of the fitting, the first yarns stitched into the flexible substrate; and
   an encapsulant encapsulating the first yarns, the primer coating, and the outer portion of the fitting, the encapsulant disposed on the flexible substrate, the encapsulant comprising a third fuel-tolerant material, the third fuel-tolerant material chemically bonded to the second fuel-tolerant material and the first fuel-tolerant material.

2. The fuel cell of claim 1 further comprising:
   second yarns stitched into the flexible substrate and over the first yarns, the encapsulant encapsulating at least some of the second yarns.

3. The fuel cell of claim 1, wherein the first fuel-tolerant material and the second fuel-tolerant material are polyvinylidene fluoride, and the third fuel-tolerant material is a polyurethane resin.

4. The fuel cell of claim 1, wherein the first yarns are bicomponent yarns comprising a core and a sheath.

5. The fuel cell of claim 4, wherein the sheath comprises a bicomponent filament having a melting point in a range of 50° C. to 200° C.

6. The fuel cell of claim 1, wherein bundles of the first yarns are threaded through respective ones of the first openings of the fitting, the first yarns of the bundles radiating from the first openings.

7. The fuel cell of claim 6, wherein the first yarns of the bundles curve in a first direction as the first yarns radiate from the first openings.

8. The fuel cell of claim 6, wherein the first yarns of the bundles fan out as the first yarns radiate from the first openings.

9. The fuel cell of claim 1, wherein the fitting comprises a second opening extending through an inner portion of the fitting, the inner portion of the fitting not covered by the encapsulant.

* * * * *